May 27, 1941. O. KLEMPERER 2,243,102
ELECTRON DEVICE
Filed April 23, 1938
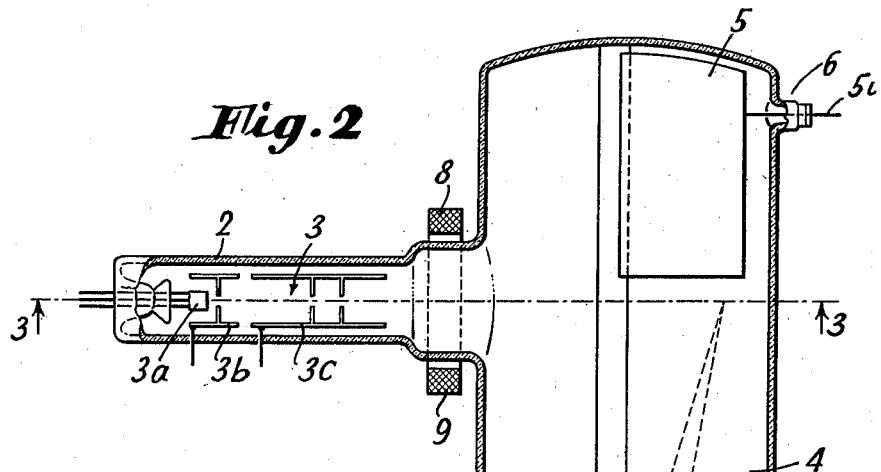
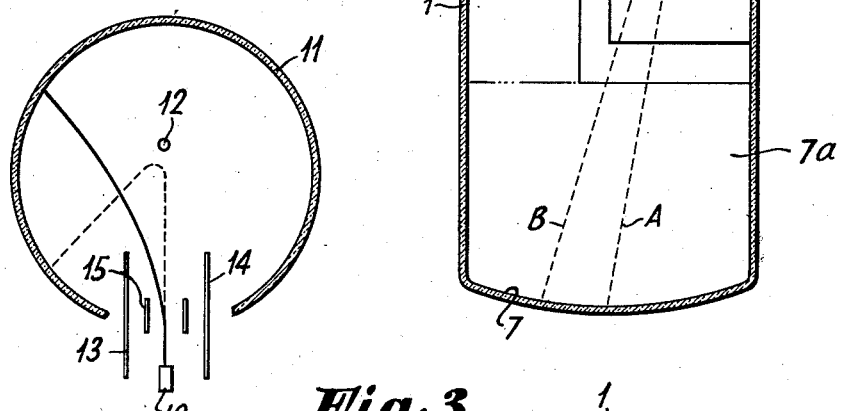
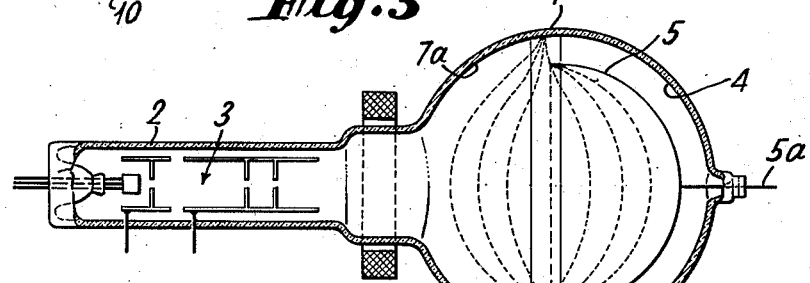
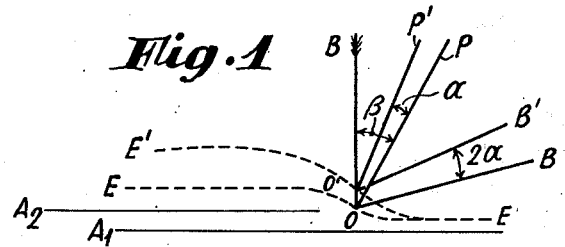
INVENTOR
OTTO KLEMPERER
BY
ATTORNEY Patented May 27, 1941

2,243,102

UNITED STATES PATENT OFFICE 2,243,102

ELECTRON DEVICE

Otto Klemperer, Iver, England, assignor to Electric & Musical Industries Limited, Hayes, Middlesex, England, a company of Great Britain Application April 23, 1938, Serial No. 203,752
In Great Britain May 1, 1937

10 Claims. (Cl. 250—158)

The present invention relates to a method of and arrangements for deflecting an electron beam such as the ray in a cathode ray tube.

The electrostatic deflection of electron beam is usually affected by passing the beam through the electric field of a plate condenser which may be varied to produce a variable deflection of the beam, the action of the variable electric field on the beam being analogous to that of a prism of variable refractive index inserted in the path of a beam of light.

Now an electron beam may not only be refracted but the electrons of a beam may be caused to be reflected at an equipotential surface of sufficient negative potential with respect to the source of electrons. Thus if an equipotential surface is set up which reflects an electron beam and the shape of the surface is changed, the reflected electron beam will be deflected to a new position.

Assuming that the inclination of the equipotential surface to the direction of the incident electron beam is changed by an angle $\alpha$, then the reflected electron beam will be deflected through an angle $2\alpha$ due to the change in the inclination of the equipotential surface, the case being similar to that of a light ray reflected by a variably inclined mirror. Thus the effect of changing the inclination of the equipotential surface is to produce still greater change in the inclination of the reflected beam.

In accordance with the present invention the above described phenomenon is utilized by providing an arrangement for setting up equipotential surfaces adapted to reflect an incident electron beam, in which the inclination of the equipotential with repect to the incident electron beam may be varied under the control of applied signal voltages or the like to cause the direction of the reflected beam to vary. Such an arrangement may be used for example, in producing the variable deflection of cathode rays in a cathode ray tube or it might be applied in an electron multiplier or deflection tube, where an electron beam is deflected in accordance with applied signals.

The method of carrying the invention into practice will be readily understood from the following description in detail with reference to Figs. 1 to 4 of the accompanying drawing in which Fig. 1 is a diagram to explain the actions of electrons;

Fig. 2 is a diagrammatic sectional elevation of a monitoring tube for use in a signal transmission system, the tube including a deflecting arrangement constructed in accordance with the invention;

Figure 3 is a diagrammatic cross section of the tube shown in Fig. 2 along the line 3—3 of Fig. 2, and Fig. 4 is a diagrammatic sectional view of another arrangement which may be used in accordance with the invention.

As represented in Fig. 1 of the accompanying drawing, equipotential surfaces such as E, E may be set up by negatively charged electrodes or conductors $A_2$, $A_1$ in the path of an electron beam BOB so as to produce a reflection of the beam as indicated at O. Now, by changing the potential of $A_2$ to a slightly more negative value, the equipotential surface at EE might be displaced to occupy the position E'E, so that the electron beam is now reflected from a point O' along the line O'B'.

If OP and O'P' represent the normals to the surface at the points of reflection of the beam and it will be seen that if $\beta$ is the original inclination of the beam BO to the normal OP and if $\alpha$ is the change in inclination of the equipotential surface, then the angle between the direction BO' and the normal O'P' will be $(\beta-\alpha)$, thus assuming the normal laws of reflection hold for displacement of the equipotential surface the angle between the paths of the beam before and after reflection will be $2\beta$ and $2(\beta-\alpha)$, respectively, thus the angle between the path of the reflected beam before and after displacement of the equipotential surface must be $2\beta-2(\beta-\alpha)=2\alpha$.

In an arrangement according to the invention the deflection sensitivity, i. e. the angular deflection produced in the electron beam due to the application of a potential of one volt to electrode $A_2$, will be greater, the smaller the angle of incidence of the beam because the more perpendicular beams are more slowed down by the electric field in the neighborhood of the equipotential at which reflection takes place or so called "electron mirror." However, if the beam is slowed down too much at reflection, it is possible that the electrons forming the beam will begin to diffuse. Also if the arrangement is used to deflect high intensity electron beams there is a possibility that the action of the equipotential surface may be disturbed by space effects, so that it would not act as a true reflector.

Thus the invention is chiefly applicable to use in measuring tubes where the intensity of the electron beams to be reflected can be kept small, or in deflection valves, in which beams of relatively small intensities are modulated, as for example, the primary beam in an electron multiplier, or the scanning beam in an iconoscope.

However, large intensity beams may be readily reflected at relatively large angles of incidence by means of a device according to the invention, and the arrangement might be applicable for the scanning of intense beams in cathode ray tubes for television receiving and for deflection valves.

Referring to Figures 2 and 3, it will be seen that the tube therein shown comprises an envelope having a cylindrical main portion or bulb 1 and a cylindrical extension or neck 2 extending at right angles to the axis of the portion 1. In the neck 2 is located a cathode ray gun indicated generally by reference numeral 3 of the kind commonly used in iconoscopes and which is capable of producing a cathode ray beam with a great depth of focus. The gun 3 comprises a cathode 3a, a beam defining or controlling electrode 3b and a first anode 3c and is arranged to project a cathode ray axially of the neck 2 when the electrodes 3a, 3b and 3c are connected in suitable electric circuits so as to acquire suitable potentials. Arranged on the wall of the bulb 1 of the tube opposite the mouth of the neck 2 is an electrode 4 of large area which may be constituted for example by a metallic film for example of silver deposited on the glass of the tube envelope, or the electrode may be formed of sheet metal and supported clear of the glass or other material of the envelope. In the example shown the electrode 4 is represented as being in the form of a metallic film and is thus of semi-cylindrical form and is about two-thirds as long as the bulb 1. The electrode extends from the end of the bulb 1, shown uppermost in the drawing, adjacent the neck 2. A connection may be made from an external electric circuit to the electrode 4 by a lead not shown in the drawing. Over the upper part of the electrode 4 is arranged a further electrode 5 comprising of a sheet metal member suitably supported within the bulb 1, the electrode 5 being adapted to be connected in an external circuit by means of the lead 5a which is introduced through the wall of bulb 1 and an aperture 6 in the electrode 4 in such a way as to be insulated from the electrode 4, the electrode 5 is arranged to extend to within a short distance of the axis of the neck 2. The lower end of the bulb 1 is coated with material which fluoresces under bombardment by a cathode ray, the coating being indicated at 7 in Fig. 2. Surrounding the fluorescent screen 7, as shown at 7a is a silver coating deposited on the wall of bulb 1, this coating constituting a second anode and extending over the whole of the inner surface of the bulb 1 not covered by electrode 4, except for a narrow band around electrode 4 which is left uncovered to insulate that electrode from the second anode. The second anode 7a might be formed as a self supporting member, or incorporated with the screen 7 for example as described in British patent specification No. 469,419. Deflecting means such as scanning coils 8 and 9 may be provided at the inner end of the neck 2.

In the above arrangement the electrodes 4 and 5 correspond to the electrodes A1 and A2 respectively of Figure 1, and in use the two electrodes are normally maintained at nearly the same electrical potential which is slightly negative with respect to the cathode of the gun 3 and potential variations corresponding to potential changes to be observed or measured are applied to the electrode 5. As described in connection with Fig. 1 of the drawing, equipotential surfaces will be set up in front of the electrodes 4 and 5 in the path of the cathode ray from the gun 3 which will thereby be reflected onto the screen 7 along the path indicated by dotted line A, the deflection varying in accordance with the modulating potential applied to the electrode 5, for example as indicated by the dotted line B. Profile views of equipotential surfaces set up taken in a plane parallel to and including the axis of the gun at right angles to the axis of the bulb 1 of the tube are indicated approximately in dotted lines in Fig. 3. It will be observed that these equipotential surfaces are mainly curved and in all cases where the cathode ray is reflected on to the screen, the electron mirror constituted by electrodes 4 and 5 will produce a cylindrical focusing effect on the cathode ray, which, to some extent balances the cylindrical focusing effect produced by the bending of the equipotential surfaces in the plane parallel to the axis of the bulb 1, which bending is clearly shown in the case of the equipotentials EE and EE' in Fig. 1. Thus by suitably choosing the potentials of electrodes 4 and 5 the reflecting equipotential may be such as to reflect the cathode ray with a substantially spherical focusing effect. The second anode 7a will be maintained at a high positive potential, as well understood by those skilled in the art.

The arrangement so far described with reference to Figs. 2 and 3 serves to give an indication on screen 7 of the magnitudes of the modulating potential applied to the electrode 5 due to the deflection of the ray produced by changing the inclination of the mirror equipotential. However, in order to give a continuous trace of a wave form as is well known, means are normally provided in the tube for producing a deflection of the cathode ray at right angles to the direction of the deflection produced under the control of the modulating potentials. In the case shown the deflecting means are represented by scanning coils 8, which may be suitably energized to sweep the ray from side to side under the control of current of saw-tooth wave form in well understood manner so that the beam produced by the cathode ray will sweep out a series of traces showing the variation of the potential of the electrode 5 during successive equal intervals of time, or, for example, during complete cycles of a signal wave applied to the electrode 5.

With an arrangement of the kind shown in Figs. 2 and 3, it was found possible to obtain a deflection sensitivity more than five times as large as that of a standard monitor tube used in a television system, that is to say, the deflection sensitivity with an arrangement according to the invention was found to be greater than 0.5° per volt, with a steady potential on electrodes 4 and 5 of 1000 volts negative with respect to the anode. Under these conditions the spot produced by the deflected ray on the screen 6 was found to remain well defined, though the proportionality of the deflecting voltage and deflection was maintained only at relatively small voltages.

An alternative arrangement of electrodes for carrying the invention into practice is shown diagrammatically in Fig. 4 of the drawing, which shows an arrangement similar to that described in British patent specification No. 465,144 with reference to Fig. 3 thereof. In Fig. 4, 10 is a cathode ray gun arranged outside a cylindrical electrode 11 which may be incorporated with a fluorescent screen formed on the wall of a tube for example as described in aforesaid British patent specification No. 469,419. The gun 10 is arranged with its axis at right angles to and intersecting the axis of the electrode 11 and in the vicinity of the axis of electrode 11 but preferably slightly displaced therefrom away from gun 10 is a rod electrode 12. Screens 13 and 14 are arranged about gun 10 to shield the cathode ray beam from premature action due to the field of electrode 11 and a pair of deflecting plates 15 may be arranged to deflect the beam from gun 10 away from electrode 12, or the gun 10 itself may be so directed to project the cathode ray in the desired direction. Deflecting means may also be provided for deflecting the beam in a direction parallel to the axis of electrode 11.

With the arrangement of Fig. 4, electrode 11 is maintained at a high positive potential with respect to the cathode of gun 10 and electrode 12 is maintained at a negative potential, the potential of which variations are to be observed, or which is to be measured or utilized being applied to this electrode. Reflecting equipotential surfaces will be set up concentrically about electrode 12 and upon variation of the potential on electrode 12, a variation in the deflection of the ray from gun 10 will result, this variation in deflection depending on the alteration in the curvature (or reciprocal of the radius) of the reflecting equipotential and the deflection of the cathode ray produced by the deflecting plates 13 and 14. In the arrangement of Fig. 4, the deflection sensitivity will depend to a certain extent on geometrical considerations as there will be a direction of the incident cathode ray at which a variation in the radius of the reflecting equipotential will produce the greatest change of inclination of the surface with respect to the cathode ray. If desired the cathode ray gun 10 may be arranged to direct the ray in the direction for maximum deflection sensitivity or in any other desired direction, and, as mentioned above, deflection plates 14 may be omitted.

If the beam is moved at right angles to the plane of the deflection due to the variation of the reflecting equipotential, a trace of the potential wave form under observation may be obtained on the fluorescent screen as described in connection with Figs. 2 and 3.

If desired the combined fluorescent screen and anode 11 of Fig. 4 might be replaced by a system of electrodes as described and shown in aforesaid specification No. 465,144 and the arrangement used as a deflection tube. Control potentials might also be applied to deflection plates 15 as well as to electrode 12, thus increasing the sensitivity of the device.

Having described my invention, what I claim is:

1. An electron discharge device for giving a visible indication of potential variation comprising a target member, means for projecting an electron beam, semi-cylindrical electrodes adapted to be maintained at potentials negative with respect to the electron beam means, one of said electrodes being spaced longitudinally from the other along the direction of the electron beam and being adapted to have applied to it potentials of which the variation is to be observed, whereby the projected beam is reflected onto the target member.

2. A cathode ray tube comprising a cylindrical envelope closed at both ends, a target member positioned at one of the closed ends, an anode positioned adjacent to the target member, a plurality of concentric semi-cylindrical electrodes displaced longitudinally from the target member and normal thereto, and an electron gun positioned at right angles to the axis of the envelope and in line with the edge nearest said target member of one of said semi-cylindrical electrodes.

3. A cathode ray tube comprising a cylindrical envelope having a neck portion at right angles to the axis of said envelope, an electron gun within said neck portion, a pair of dissimilar concentric deflecting electrodes having their common longitudinal axis positioned normal to the axis of the electron gun, an end wall closing the cylindrical envelope, a target member adjacent to the end wall, and a focusing electrode intermediate said end wall and deflecting electrodes.

4. A cathode ray tube comprising a cylindrical envelope having a neck portion at right angles to the axis of said envelope, an electron gun within said neck portion, a pair of dissimilar concentric deflecting electrodes having their common longitudinal axis positioned normal to the axis of the electron gun, an end wall closing the cylindrical envelope, a target member adjacent to the end wall, and a focusing electrode intermediate the end wall and the deflecting electrodes, said focusing electrode being also intermediate the electron gun and the deflecting electrodes.

5. A cathode ray tube comprising a cylindrical envelope having a neck portion at right angles to the axis of said envelope, an electron gun within said neck portion, a pair of dissimilar concentric electron reflecting electrodes having their common longitudinal axis positioned normal to the axis of the electron gun, an end wall closing the cylindrical envelope, a target member adjacent to the end wall, and a focusing electrode intermediate said end wall and deflecting electrodes.

6. A cathode ray tube comprising a cylindrical envelope having a neck portion at right angles to the axis of said envelope, an electron gun within said neck portion, a pair of dissimilar concentric electron reflecting electrodes having their common longitudinal axis positioned normal to the axis of the electron gun, an end wall closing the cylindrical envelope, a target member adjacent to the end wall, and a focusing electrode intermediate the end wall and the deflecting electrodes, said focusing electrode being also intermediate the electron gun and the deflecting electrodes.

7. An electron discharge device comprising means for projecting a beam of electrons along a predetermined path, concentric electron reflecting means having its longitudinal axis positioned normal to the predetermined path, and a target member positioned normal to the said reflecting means axis and displaced longitudinally therefrom.

8. An electron discharge device comprising means for projecting a beam of electrons along a predetermined path, combined concentric electron deflecting and reflecting means having its longitudinal axis positioned normal to the predetermined path, and a target member positioned normal to the said reflecting means axis and displaced longitudinally therefrom.

9. An electron discharge device comprising means for projecting a beam of electrons along a predetermined path, combined concentric electron deflecting and reflecting means having its longitudinal axis positioned normal to the predetermined path, a target member positioned normal to the said reflecting means axis and displaced longitudinally therefrom, and focusing means intermediate the reflecting means and both the beam projecting means and the target member.

10. An electron discharge device comprising means to project a beam of electrons along a predetermined path, at least one semi-cylindrical reflecting electrode having its longitudinal axis positioned normal to the predetermined path, and a single target electrode positioned normal to the axis of said reflecting electrode.

OTTO KLEMPERER